United States Patent
Shibuya et al.

(10) Patent No.: US 7,430,255 B2
(45) Date of Patent: Sep. 30, 2008

(54) IMPULSE NOISE SUPPRESSION DEVICE

(75) Inventors: Takako Shibuya, Kobe (JP); Tomohisa Tanaka, Kobe (JP)

(73) Assignee: TOA Corporation, Kobe-Shi, Hyogo (JP)

( * ) Notice: Subject to any disclaimer, the term of this patent is extended or adjusted under 35 U.S.C. 154(b) by 630 days.

(21) Appl. No.: 10/491,821

(22) PCT Filed: Oct. 8, 2002

(86) PCT No.: PCT/JP02/10428

§ 371 (c)(1),
(2), (4) Date: Apr. 6, 2004

(87) PCT Pub. No.: WO03/032560

PCT Pub. Date: Apr. 17, 2003

(65) Prior Publication Data

US 2004/0247060 A1 Dec. 9, 2004

(30) Foreign Application Priority Data

Oct. 9, 2001 (JP) ............................. 2001-311148

(51) Int. Cl.
*H04B 1/10* (2006.01)
*H04B 15/00* (2006.01)
*H03B 29/00* (2006.01)
*G10L 21/00* (2006.01)

(52) U.S. Cl. ............ 375/346; 381/94.1; 381/94.5; 381/71.1; 381/71.9; 704/226; 704/227; 704/228; 704/E21.004

(58) Field of Classification Search ........ 381/94.1–94.9, 381/71.1, 71.9, 13; 375/346; 704/226–228, 704/212, E21.004
See application file for complete search history.

(56) References Cited

FOREIGN PATENT DOCUMENTS

| JP | 7-87001 | 3/1995 |
| JP | 07087001 A | * 3/1995 |
| JP | 9-139980 | 5/1997 |
| JP | 2000-196568 | 7/2000 |

OTHER PUBLICATIONS

Applicant's admitted prior art, p. 7, lines 1-2.*

* cited by examiner

*Primary Examiner*—Vivian Chin
*Assistant Examiner*—Devona E. Faulk
(74) *Attorney, Agent, or Firm*—Duane Morris LLP

(57) ABSTRACT

Digital audio data with error detection bits added thereto is inputted to an error detecting and correcting device (4). The correcting device (4) corrects an error when the error is detected in the digital audio data. The digital audio data outputted from the error detecting and correcting device (4) is inputted to an impulse noise suppressing circuit (6). The suppressing circuit (6) operates for a predetermined time period when the correcting device (4) detects an error.

5 Claims, 2 Drawing Sheets

IMPULSE NOISE SUPPRESSION DEVICE

TECHNICAL FIELD

This invention relates to an impulse noise suppressing apparatus for suppressing impulse noise appearing in digital audio data.

BACKGROUND OF THE INVENTION

In a digital audio system, if a sampling data piece erroneously is made to have a level significantly different from the level of the true data piece, large noise is generated. Such noise is referred to as impulse noise. Impulse noise is significantly noticeable when it occurs for a sampling data piece having a small amplitude.

Conventionally, an impulse noise suppressing circuit has been used to remove such impulse noise. The impulse noise suppressing circuit monitors levels of respective sampling data pieces. If the level of given sampling data piece $D_n$ is dominant to the levels of preceding and succeeding sampling data pieces $D_{n-1}$ and $D_{n+1}$, the sampling data piece $D_n$ is judged to be impulse noise, and the preceding sampling data piece $D_{n-1}$ is substituted for the sampling data piece $D_n$.

The impulse noise suppressing circuit is in operation all the time. Accordingly, if a sampling data piece, a high frequency component, for example, other than impulse noise, that has a level dominant to preceding and succeeding sampling data pieces is applied to the impulse noise suppressing circuit, it will be mistaken for impulse noise, and sampling data substitution will be done. High frequency components, which are not impulse noise, are cut away, which degrade sound quality.

An object of the present invention is to provide an impulse noise suppressing apparatus which can reduce degradation of sound quality, while suppressing impulse noise.

DESCRIPTION OF THE INVENTION

An impulse noise suppressing apparatus according to the present invention has error detecting means, which receives digital audio data with error detection bits added to it. The digital audio data pieces are successively applied to the error detecting means at predetermined sampling intervals. Any one of known methods may be employed as the error detection technique for the present invention. The digital audio data pieces outputted from the error detecting means are applied to impulse noise removing means, which operates for a predetermined time period when the error detecting means detects an error.

Generally, error in a digital signal occurs randomly. Such error is called random error. There is no correlation between error bits of one and another digital signals in which random error occurs. Other error is called burst errors which occur collectively with error bits correlated with each other. In case of wireless communications, for example, many burst errors may occur when a received wave becomes weak or affected by interfering waves. When the received wave becomes weak, background noise is demodulated, and noise data is substituted for true data. When a reflection wave interferes, time-delayed data is substituted for the true data. In any case, weakening of the received signal or interference does not occur abruptly at a certain bit timing, but it occurs gradually at relatively long time intervals in terms of bit rate. Substitution of erroneous data pieces for true data pieces does not occur for all bits following one bit timing, but error occurs first in a smaller number of bits and the number of bits containing error gradually increases in succeeding data pieces. In other words, burst errors are errors occurring first at a lower bit rate and, thereafter, at a gradually increasing bit rate.

There may be three audio digital data receiving conditions 1 through 3 categorized in accordance with the frequency of errors in the data.

Condition 1 (with No Error)

In Condition 1, no error occurs in digital audio data and the digital audio data can be received normally.

Condition 2 (with Errors within the Error Detecting Ability)

Errors in Condition 2 are errors which can be detected.

Condition 3 (with Errors Beyond the Error Detecting Ability)

Errors occurring in Condition 3 cannot be detected.

Probability of transition from Condition 1 to Condition 3 and probability of transition from Condition 3 to Condition 1 are very small relative to probability of transition from Condition 1 to Condition 2, probability of transition from Condition 2 to Condition 1, probability of transition from Condition 2 to Condition 3, and probability of transition from Condition 3 to Condition 2.

When errors occur, in other words, when in Condition 2 or 3, it is highly probable that impulse noise will be generated. Therefore, it is desired that the impulse noise removing means be operated in Condition 2 or 3, but it is desired that the impulse noise removing means be not operated in Condition 1. Then, it is desired to operate the impulse noise removing means by triggering it in response to detection of errors by the error detecting means, but the error detecting means cannot detect errors in Condition 3 and, therefore, the impulse noise removing means cannot be operated.

The present invention is based on the above-described recognition that, because of the characteristic of burst error, the probability of occurrence of transition from Condition 1 to Condition 3 is very low, while it is highly probable that Condition 2 occurs prior to the occurrence of Condition 3. According to the present invention, the impulse noise removing means is caused to operate for a predetermined time period after the error detecting means detects an error so that the impulse noise removing means can operate even in Condition 3 where undetectable errors occur, to thereby remove impulse noise. According to the present invention, the impulse noise removing means is prevented from operating in the no-error condition, i.e. in Condition 1, to thereby prevent sound quality degradation.

The use of error detecting means only for detecting errors has been described. However, error detecting and correcting means which not only can detect errors in audio data but also can correct the detected errors may be used. In such application, digital audio data from the error detecting and correcting means is applied to the impulse noise removing means, which is caused to operate for a predetermined time period when the error detecting and correcting means detects errors.

The following four conditions of digital audio data a through d may be considered when performing error correction.

Condition a (with No Error)

In Condition a, digital audio data includes no error and, therefore, can be received normally.

Condition b (with Errors within the Error Detecting Ability)

Errors occurring in Condition b are detectable, and, the detected errors can be corrected in any way.

Condition c (with Errors Detected But not Correctable)

Errors can be detected by chance in Condition c, from which one can know only that the digital audio data is not being correctly received. This Condition c may indicate that the error correcting ability of the means is lower than the error detecting ability, and, therefore, while errors can be detected, they cannot be corrected.

Condition d (Errors Beyond the Error Detecting Ability)

Errors occurring in Condition d cannot be detected and, therefore, cannot be corrected.

Probability of transition from Condition a to Condition c, transition from Condition c to Condition a, transition from Condition a to Condition d, or transition from Condition d to Condition a, is very small relative to probability of transition from Condition a to Condition b, transition from Condition b to Condition a, transition from Condition b to Condition c, or transition from Condition c to Condition b, transition from Condition c to Condition d, or transition from Condition d to Condition c.

In case of errors, original digital audio data should be able to be reproduced if the errors can be corrected, and, therefore, no impulse noise will be generated. However, if uncorrectable errors occur, impulse noise may be generated. Accordingly, it is desired that the impulse noise removing means be operated only in Conditions c or d where errors cannot be corrected. However, there is no way to correctly identify the occurrence of Condition c or d. For example, when the impulse noise removing means is arranged to be triggered to operate in response to detection of errors by the error detecting and correcting means, it can operate properly in Condition b or c, but it cannot be operated when Condition d occurs.

Then, taking advantage of the characteristic of burst errors that prior to the occurrence of Condition d, Condition c highly probably occurs, the impulse noise removing means is operated for a predetermined time period upon detection of errors by the error detecting and correcting means, so that the impulse noise removing means can operate even in the event of Condition d to thereby remove impulse noise, while deactivating the impulse noise removing means if no errors occur, whereby degradation of sound quality is prevented.

It should be noted that, in Condition b, the error detecting and correcting means operates and corrects the errors, and, therefore, it would not necessary for the impulse noise removing means to be operated. However, the impulse noise removing means actually operates, which degrades the sound quality. If the error detecting means only were used instead of the error detecting and correcting means, the impulse noise removing means ought to operate in Condition b (which is equivalent to Condition 2 mentioned above for a case where only the error detection is done), where errors occur actually and, therefore, sound quality degradation ought to occur. Accordingly, it does not mean that possibility of degradation of sound quality is increased by unnecessary operation of the impulse noise removing means.

The impulse noise removing means may be so arranged as to substitute for currently inputted digital audio data, either one of the preceding and succeeding digital audio data when the level of the currently inputted digital audio data protrudes above the preceding and succeeding digital audio data levels. In view of digital audio data correlation, it is desirable to substitute the preceding digital audio data.

The digital audio data may be data derived by demodulating a digital modulation signal transmitted through a wireless transmission path. Impulse noise tends to be generated particularly when the digital modulation signal is propagating through the wireless transmission path in a bad condition. Accordingly, it is useful to use the impulse noise suppressing apparatus according to the present invention for digital audio data derived by demodulating a digital modulation signal transmitted through a wireless transmission path.

BEST MODE FOR EMBODYING THE INVENTION

Figure 1:
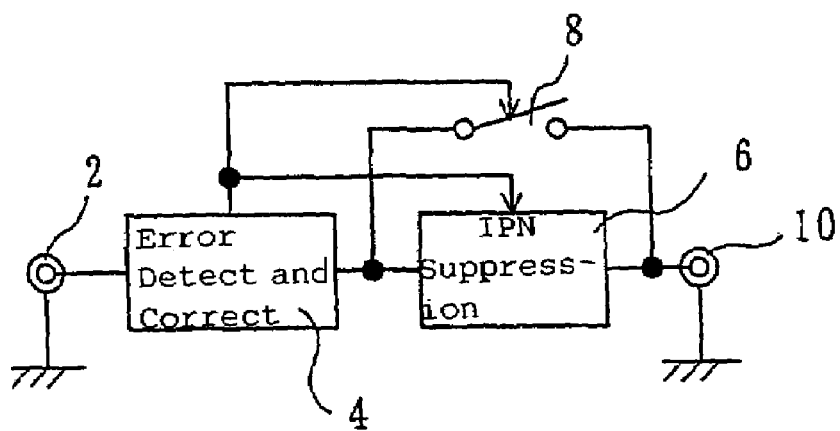
FIG. 1 is a block circuit diagram of an impulse noise suppressing apparatus according to one embodiment of the present invention.

As shown in FIG. 1, an impulse noise suppressing apparatus according to one embodiment of the present invention has an input terminal 2, to which inputted is a series of digital audio data pieces provided by demodulating, by a demodulator, a digital modulation signal transmitted from a wireless telephone, for example, over a wireless transmission path. A detection bit for use in error detection and correction has been added to these digital audio data pieces at the transmission source, i.e. the wireless telephone. Known techniques such as the parity check technique, the BCH code technique and the Reed-Solomon technique, may be used singly or in combination for error detection and correction. Digital audio data pieces are applied to the input terminal 2 every predetermined sampling period.

A series of digital audio data pieces inputted at the input terminal 2 are applied to error detecting and correcting means, e.g. an error detecting and correcting device 4. The error detecting and correcting device 4 has a configuration appropriate to the error detecting and correcting technique employed, and detects an error in the inputted digital audio data. If an error is not detected, the error detecting and correcting device 4 outputs the digital audio data piece as it is, whereas, if it detects an error, it corrects the error before outputting it. The error detecting and correcting device 4, when detecting an error, develops an error-detection representative signal shown in FIG. 2a.

An output of the error detecting and correcting device 4 is applied to impulse noise removing means, e.g. an impulse noise (IPN) suppressing circuit 6. The impulse noise suppressing circuit 6 deems an inputted digital audio data piece as impulse noise when the input digital audio data piece dominates in level a preceding digital audio data piece, e.g. an immediately preceding data piece and a succeeding digital audio data piece, e.g. an immediately succeeding data piece, and substitutes, for example, the immediately preceding digital audio data piece for the digital audio data piece.

Figure 3A:
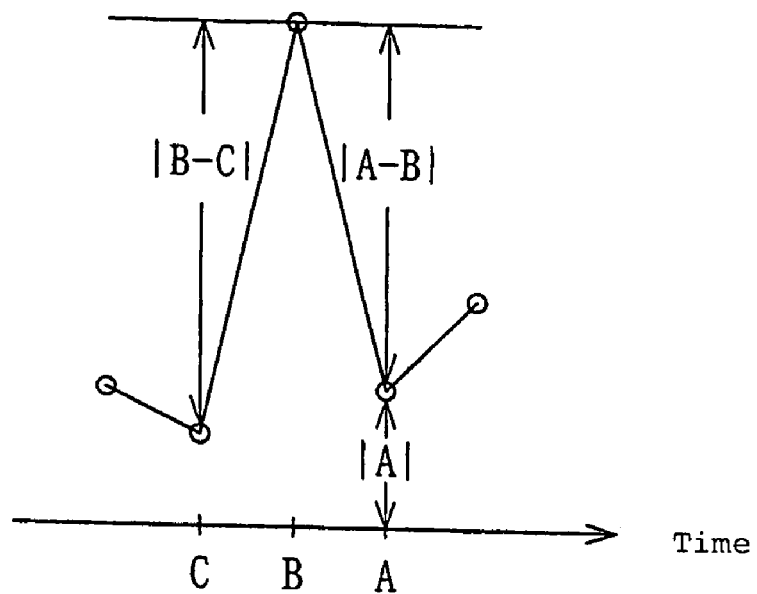
FIG. 3a shows impulse noise as applied to the impulse noise suppressing circuit of FIG. 1.

More specifically, the impulse noise suppressing circuit 6 operates in the following manner. For example, as shown in FIG. 3a, a digital audio data piece C immediately precedes a currently inputted digital audio data piece B, and a digital audio data piece A immediately succeeds the digital audio data piece B. As the criteria for determining if data pieces are impulse noise, the following three, for example, can be thought.

(1) The absolute value of the difference between A and B is larger than the absolute value of A ($|A-B|>|A|$). In other words, B is larger in level than A.

(2) A is larger than B (A>B), and C is larger than B (C>B), or B is larger than A (A<B), and B is larger than C (B>C). In other words, the sloping orientation of the line connecting A and B is opposite to that of the line connecting B and C.

(3) The absolute value of the difference between B and C is more than twice as larger as the absolute value of A ($|B-C|>2|A|$).

If the event (3) occurs simultaneously with the event (1) or (2), B can be judged to dominate C and A. Any appropriate one of various techniques may be employed to determine whether impulse noise is generated or not.

Figure 3B:
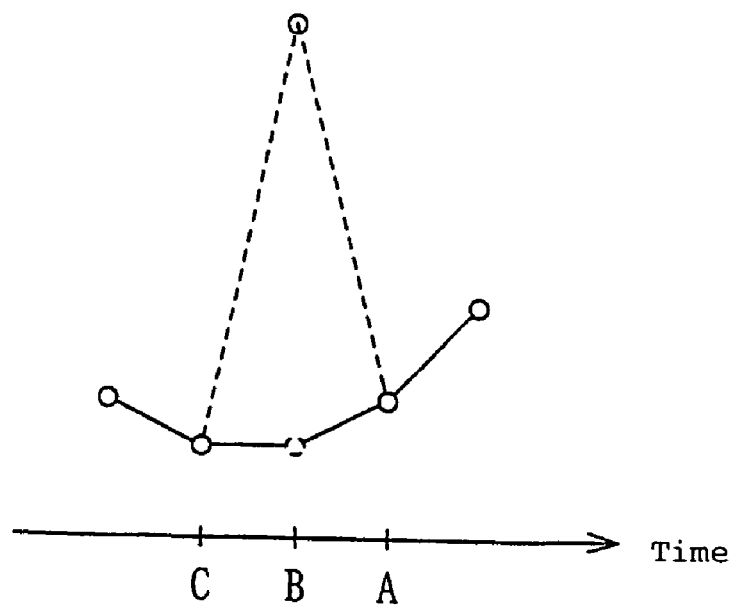
FIG. 3b shows the result of suppressing the impulse noise in the impulse noise suppressing circuit.

When the presence of impulse noise is detected, the impulse noise suppressing circuit 6 substitutes, as shown in FIG. 3b, the immediately preceding digital audio data piece, e.g. data piece C, for the digital audio data piece, e.g. data piece B, that has been judged to be impulse noise, whereby impulse noise is suppressed. If it has been judged that no impulse noise is present, no impulse noise suppression is carried out.

Figure 2A:
FIG. 2a is an error-detection representative signal developed by an error detecting and correcting device shown in FIG. 1.
Figure 2B:
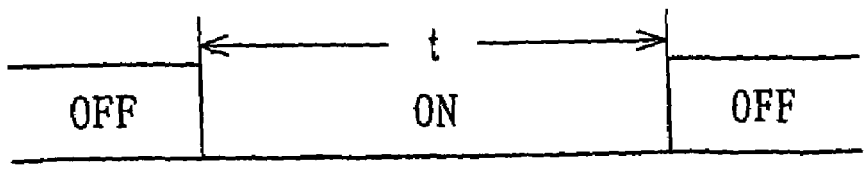
FIG. 2b is useful in explaining how the impulse noise suppressing circuit shown in FIG. 1 operates in response to the error-detection representative signal.

As shown in FIG. 2b, the impulse noise suppressing circuit 6 is supplied with an error-detection representative signal in such a manner that it can operate for a predetermined time period of t after the error detecting and correcting device 4 develops the error-detection representative signal as shown in FIG. 2a. The predetermined time period t is sufficiently longer than a usual presumed time period during which a burst error is occurring. Specifically, the time period t may be several milliseconds (ms), and desirably from 2 to 3 milliseconds. In order for the output signal of the error detecting and correcting device 4 to be coupled to an output terminal 10 when the impulse noise suppressing circuit 6 is not operating, a switch 8 is connected between the input and output of the impulse noise suppressing circuit 6. The switch 8 is opened for the predetermined time period t following the development of the error-detection representative signal, and otherwise is closed. Accordingly, when no error is detected, the output signal of the error detecting and correcting device 4 is applied through the switch 8 to the output terminal 10. On the other hand, the output signal of the error detecting and correcting device 4 is applied to the impulse noise suppressing circuit 6 during a time period of t following the detection of an error. When the impulse noise suppressing circuit 6 judges that impulse noise is present, the output signal of the impulse noise suppressing circuit 6 with the impulse noise suppressed is coupled to the output terminal 10. If the impulse noise suppressing circuit 6 judges that no impulse noise is present for the predetermined time period t after the detection of the error, the output signal itself of the error detecting and correcting device 4 is coupled through the impulse noise suppressing circuit 6 to the output terminal 10.

With the above-described arrangement of the impulse noise suppressing apparatus, the output of the error detecting and correcting device 4 is applied to the output terminal 10 through the closed switch 8 when the error detecting and correcting device 4 does not detect an error. When the error detecting and correcting device 4 develops an error-detection representative signal upon detection of an error, the impulse noise suppressing circuit 6 operates for the predetermined time period $t$ after the development of the error-detection representative signal by the error detecting and correcting device 4, and the switch 8 is kept open for the predetermined time period $t$ in response to the error-detection representative signal.

The error detecting ability of the error detecting and correcting device 4 is limited, and, if the number of errors occurring is beyond the error detecting ability, there is a possibility that the error detecting and correcting device 4 will not detect errors. If errors cannot be detected by the error detecting and correcting device 4, impulse noise may be generated.

There is a small possibility that the situation where there is no error will suddenly changes to a situation where errors cannot be detected. It is highly possible that errors are detected before the situation where errors cannot be detected occurs. For example, an initial situation is that errors are few so that they can be detected and corrected, followed by a situation where errors increase so that, while they can be detected, they cannot be corrected, and, then, by a situation where errors can be neither detected nor corrected. Another case may be that initially, errors can be detected but not corrected, followed by a situation where errors can be neither detected nor corrected. In either case, a situation where errors are detected occurs first, and, therefore, the impulse noise suppressing circuit 6 of the impulse noise suppressing apparatus according to the present invention is arranged to operate for a while after an error is detected on the assumption that it is possible that a situation where errors cannot be corrected will continue for a while.

If a situation where errors cannot be corrected and impulse noise is generated happens while the impulse noise suppressing circuit 6 is operating, the impulse noise suppressing circuit 6 suppresses the impulse noise.

In a situation where no errors are occurring, the impulse noise suppressing circuit 6 is not operating, and, therefore, if a digital audio data piece having a protruding level is applied to the input terminal 2, it never happens that the impulse noise suppressing circuit 6 mistakes it for impulse noise and suppresses it. Therefore, the sound quality is not degraded.

In the described embodiment, the predetermined time period $t$ for which the impulse noise suppressing circuit 6 continues to operate is set to be sufficiently longer than the usually expected time period of burst error. The time periods or lengths during which burst errors occur are distributed over a range. The time period $t$ is set to be sufficiently long so as not to be exceeded even by the time period of scarcely occurring burst errors. It should be noted that, depending on a system arrangement and an environmental condition, the property or contents of burst errors and the time period of burst errors vary, and, therefore, the time period $t$ cannot be determined stereotypically. The time period $t$ is set to such a value that the impulse noise suppressing circuit 6 can operate most efficiently and can stop operating as soon as burst errors terminate.

Other than setting the time period $t$ to be sufficiently long, it can be set to a value approximately equal to a normally expected burst error period or can be shorter. With the time period $t$ being not sufficiently long, burst errors extending beyond the time period $t$ may occur. Due to burst errors, errors beyond the error detecting ability of error detecting and correcting device 4 may be generated, which may be uncertainly detected by chance. By arranging that the impulse noise suppressing circuit 6 be re-activated by an error-detection representative signal developed in response to such uncertain error detection, the impulse noise suppressing circuit 6 can be operated over the entire burst error time period. By setting the time period $t$ to a short time, the impulse noise suppressing circuit 6 can immediately stop operating when burst errors terminate, so that a time period during which sound quality degradation would be caused by unnecessary operation of the impulse noise suppressing circuit 6 can be reduced.

One embodiment of the invention has been described by means of an arrangement including the error detecting and correcting device 4, the impulse noise suppressing circuit 6 and the switch 8 illustrated in block. However, the functions of these blocks can be realized by means of a CPU or DSP. The above-described embodiment uses the error detecting and correcting device 4, but the apparatus may be configured not to achieve error correction, but to achieve error detection only. The digital audio data has been described to be digital audio data demodulated from a digital modulation signal transmitted from a wireless telephone over a wireless transmission path, but the present invention is not limited to such digital audio data. For example, the digital audio data may be demodulated from a digital modulation signal transmitted through a cable transmission path. In the above-described embodiment, when impulse noise is detected in a current digital audio data piece, an immediately preceding digital audio data piece is substituted for the current digital audio data piece, but an immediately succeeding digital audio data piece may be substituted instead. Also, as the error detecting and correcting device 4 or the error detector which may be used in place of the error detecting and correcting device 4, any appropriate one of various known devices can be used.

The invention claimed is:

1. An impulse noise suppressing apparatus comprising:
   impulse noise suppressing means judging, when in operation, an inputted digital audio data piece to be impulse noise when the level of said inputted digital audio data piece is dominant to the levels of preceding and succeeding inputted digital audio data pieces, and suppressing said inputted digital audio data piece judged to be impulse noise;
   error detecting means receiving said digital audio data pieces successively and detecting whether or not the inputted digital audio data pieces contain an error by the use of the parity check technique, the BCH code technique, or the Reed-Solomon technique, or a combination thereof; and
   operating means responsive to detection of an error by said error detecting means for operating said impulse noise suppressing means only after detection of the error by said error detecting means and then for a predetermined time period thereafter longer than a presumed time period during which a burst error ts occurring in the respective digital audio data pieces,
   wherein said predetermined time period is set such that said impulse noise suppressing means stops operating as soon as the burst errors terminate.

2. The impulse noise suppressing apparatus according to claim 1 wherein said impulse noise suppressing means, when judging an inputted digital audio data piece to be impulse noise, substitutes either one of digital audio data pieces inputted preceding or succeeding said inputted digital audio data piece judged to be impulse noise.

3. The impulse noise suppressing apparatus according to claim 1 wherein said digital audio data pieces are derived by demodulating a digital modulation signal transmitted through a wireless transmission path.

4. The impulse noise suppressing apparatus according to claim 1 wherein said error detecting means operates to correct said digital audio data pieces in which an error is detected, and supplies corrected digital audio data pieces to said impulse noise suppressing means.

5. An impulse noise suppressing apparatus comprising:
   impulse noise suppressing means judging, when in operation, an inputted digital audio data piece to be impulse noise when the level of said inputted digital audio data piece is dominant to the levels of preceding and succeeding inputted digital audio data pieces, and suppressing said inputted digital audio data piece judged to be impulse noise;
   error detecting means receiving said digital audio data pieces successively and detecting whether or not the inputted digital audio data pieces contain an error; and
   operating means responsive to detection of an error by said error detecting means for operating said impulse noise suppressing means only after detection of the error by said error detecting means and then for a predetermined time period thereafter longer than a presumed time period during which a burst error is occurring in the respective digital audio data pieces,
   wherein said predetermined time period is set such that said impulse noise suppressing means stops operating as soon as the burst errors terminate.

* * * * *

UNITED STATES PATENT AND TRADEMARK OFFICE
CERTIFICATE OF CORRECTION

PATENT NO. : 7,430,255 B2 Page 1 of 1
APPLICATION NO. : 10/491821
DATED : September 30, 2008
INVENTOR(S) : Takako Shibuya It is certified that error appears in the above-identified patent and that said Letters Patent is hereby corrected as shown below:

At Col. 7, Line 40; delete "ts" and substitute therefore --is--.

Signed and Sealed this

Eleventh Day of November, 2008

JON W. DUDAS
*Director of the United States Patent and Trademark Office*